United States Patent
Rao et al.

(10) Patent No.: US 11,481,162 B1
(45) Date of Patent: Oct. 25, 2022

(54) SYSTEM AND METHOD FOR PRINTING COLORED MEDIA WHEN INPUT COLOR MATCHES MEDIA COLOR

(71) Applicant: Xerox Corporation, Norwalk, CT (US)

(72) Inventors: Deepthi Sidavanahalli Rao, Lake Oswego, OR (US); Thomas L. Pierce, Rochester, NY (US); Stephen M. Kroon, Sherwood, OR (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/360,104

(22) Filed: Jun. 28, 2021

(51) Int. Cl.
*H04N 1/60* (2006.01)
*G06F 3/12* (2006.01)
*G06K 15/02* (2006.01)

(52) U.S. Cl.
CPC .......... *G06F 3/1219* (2013.01); *G06F 3/1206* (2013.01); *G06F 3/1229* (2013.01); *G06K 15/027* (2013.01)

(58) Field of Classification Search
CPC ... G06F 3/1219; G06F 3/1208; G06K 15/027; G06K 15/1868; H04N 1/6097; H04N 1/00806
USPC ......... 358/1.9, 3.24, 504, 518; 382/167, 157
See application file for complete search history.

(56) References Cited

U.S. PATENT DOCUMENTS

| | | | |
|---|---|---|---|
| 7,688,486 B2 * | 3/2010 | Gießelmann | H04N 1/6033 358/1.9 |
| 8,125,688 B2 | 2/2012 | Watanabe | |
| 9,942,446 B2 * | 4/2018 | Fukuda | B41J 2/21 |
| 11,283,968 B2 | 3/2022 | Tajima | |
| 2006/0250427 A1 | 11/2006 | Kroon | |
| 2010/0060682 A1 | 3/2010 | Akatsuka | |
| 2019/0306376 A1 * | 10/2019 | Iwaki | H04N 1/6008 |
| 2020/0128150 A1 | 4/2020 | Iwaki | |

\* cited by examiner

*Primary Examiner* — Jamares Q Washington
(74) *Attorney, Agent, or Firm* — Fay Sharpe LLP

(57) ABSTRACT

A system and method are provided which enable a print media color to be used, as a replacement for a mixture of one or more colorants, in rendering portions of a print job. One or more multidimensional look-up tables are provided. Each table provides for an identified input color, in a device-independent space, to be equated to no colorant, when printed on the respective print media. The identified input color is one of a set of input colors, which, when printed and measured, has an output color that is closest to a measured color of the print media.

20 Claims, 4 Drawing Sheets

SYSTEM AND METHOD FOR PRINTING COLORED MEDIA WHEN INPUT COLOR MATCHES MEDIA COLOR

BACKGROUND

The exemplary embodiment relates to color printing and finds particular application in a system and method for defining output color values for rendering an image on colored print media.

Printers are usually provided with a set of colorants, such as inks or toners, for printing images on print media, such as paper or fabric. By using combinations of three, four, or more colorants, a wide range of printed colors (the printer's color gamut) can be achieved. When printing on colored media, a white colorant is often used an underlay to block the media color from showing through. The colors in the printer's gamut are then achieved with a mix of cyan, magenta, and yellow (C, M, and Y) colorants over the white (W) colorant. This helps in creating vibrant and true to life colors in the printed output. However, use of colorants over the entire printable area can be costly and does not take advantage of the natural color of the print media. It is therefore desirable to leave portions of the print media blank, i.e., without colorant.

Graphic designers that create documents intended for printing on colored media often use graphic design tools, such as Adobe Illustrator, to create and view documents prior to printing. However, such tools do not take the color of the selected print medium into account. Thus, for example, a designer may create a design on a "white" background, assuming this will be left blank, when printed. However, when the print job reaches the printer, the printer's software may recognize that the background should appear white, and thus apply a layer of white toner to mask the color of the print medium. This is both costly and does not achieve the designer's intent.

One approach to overcome this problem is for the designer to manually identify those areas which are to be left blank by specifying the RGB or CMYK color of the colored print medium for these areas. However, this is time consuming and has to be repeated if the designer changes the print media color. Additionally, the printer may not recognize the input color and may recreate the designer's selected color with a mix of C, M, Y, and W. This can result in the unnecessary use of significant amounts of colorant.

The present system and method enable eliminating or reducing the use of colorants where the output color value matches the print media color, providing a reduction in colorant usage.

INCORPORATION BY REFERENCE

The following references, the disclosures of which are incorporated herein by reference, in their entireties, are mentioned:

U.S. Pub. No. 20060250427 A1, published Nov. 9, 2006, entitled SYSTEMS AND METHODS THAT IMPROVE FLUID COLOR OUTPUT BY USING CLEAR OR WHITE FLUID, by Stephen M. Kroon, et al., describes an imaging system that forms an image using non-white, white, or clear ink at each pixel on a receiving medium.

U.S. Pub. No. 20200128150 A1, published Apr. 23, 2020, entitled INFORMATION PROCESSING DEVICE AND RECORDING MEDIUM, by Kaori Iwaki, et al., describes a color converter that converts color in an acquired image depending on a positional relationship between a white image forming section that forms an image on the medium with white color material and a color image forming section that forms an image on the medium with colored color material.

BRIEF DESCRIPTION

In accordance with one aspect of the exemplary embodiment, a method for adapting a printer to use a color of a print medium in printing. The method includes, with a set of colorants, printing a set of color patches on a first print medium having a first color, each of the printed color patches being generated based on a respective input color. An output color of each of the printed color patches and of an unprinted region of the first print medium are measured. The measured output color of one of the printed color patches that is closest to the measured color of the unprinted region is identified. A first multidimensional look-up table is generated in which the input color of the printed color patch having the measured output color that is closest to the color of the unprinted region is set to be printed without the colorants.

One or more steps of the method may be performed with a processor.

In accordance with another aspect of the exemplary embodiment, a system for generating multidimensional look-up tables includes a pattern generation component which sends a test pattern comprising a set of color patches to an associated marking device for rendering with a set of colorants on a first print medium having a first color to generate a set of printed color patches. An evaluation component receives a measured output color of each of the printed color patches and a measured color of an unprinted region of the first print medium, the evaluation component identifying a measured output color of one of the printed color patches that is closest to the color of the unprinted region. A look-up table generation component generates a first multidimensional look-up table in which the input color of the printed color patch having the measured output color that is closest to the color of the unprinted region is set to be printed without the colorants. A processor implements the components.

In accordance with another aspect of the exemplary embodiment, a printing system includes memory which stores a set of multidimensional look-up tables, including: a first multidimensional look-up table which has been generated by printing a test pattern on a first print medium having a first color and identifying a measured color of a printed patch that is closest to a measured color of the first print medium, in the first multidimensional look-up table, the input color of the printed color patch having the measured color that is closest to the measured color of an unprinted region of the first print medium being set to be printed without the colorants; and a second multidimensional look-up table which has been generated by printing the test pattern on a second print medium having a second color, different from the first color, and identifying a measured color of a printed patch that is closest to a measured color of the second print medium, in the second multidimensional look-up table, the input color of the printed color patch having the measured color that is closest to the measured color of an unprinted region of the second print medium being set to be printed without the colorants. A conversion component, for an input print job specifying a color of print media, identifies one of the multidimensional look-up tables based on the specified color and accesses the one of the multidimensional look-up tables to identify output color values, in a device-dependent color space, for printing the input print job. A processor implements the conversion component.

DETAILED DESCRIPTION

Figure 1:
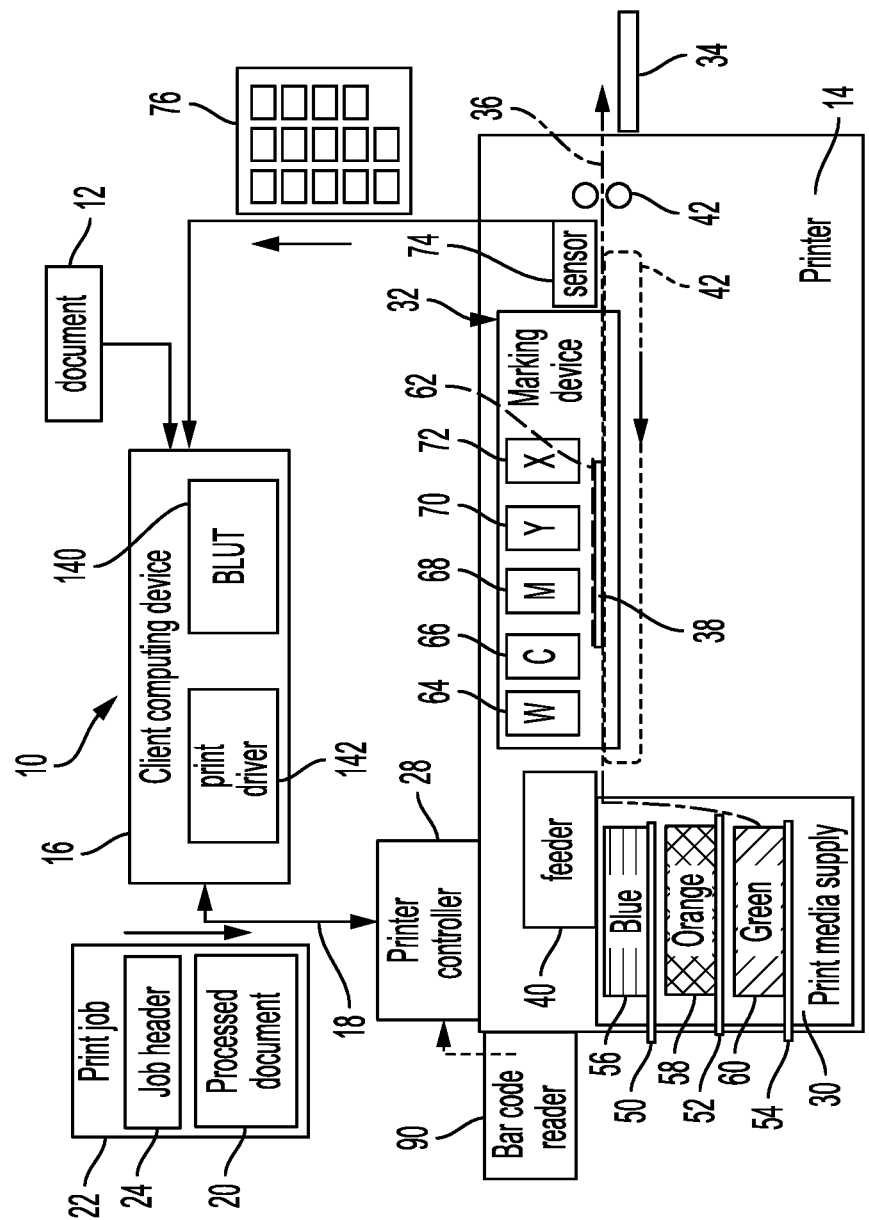
FIG. 1 is a functional block diagram of an image processing system for generating and/or employing multidimensional look-up tables in accordance with one aspect of the exemplary embodiment.

Aspects of the exemplary embodiment relate to a system and method for rendering a print job on colored print media. The system and method are configured to use a color of the print media in place of, or in addition to standard colorants.

In order to mitigate the use of a mix of C,M,Y,W colorants to match the print media color, the exemplary system and method allow for no colorant to be deposited on the media when the input color matches the print media color.

One advantage of the system and method is that colorants usage can be reduced.

Another advantage is that the color gamut of the printer may be increased. The color gamut of a printer is often limited by the maximum amount of colorant which can be applied for a given pixel. This is particularly true when one of the colorants is white. By using the print media to supply part of the colorant, the color gamut of the printer may be increased.

Another advantage of the system and method is that adjustments can be readily implemented for printing on various media colors without needing to change the document each time the media color is changed.

Another advantage is that the print media color tends to be more visible.

As used herein, a "printer" can include any device for rendering an image on print media, using colorants, such as inks or toners. Example printers include laser printers, inkjet printers, offset printers, bookmaking machines, and multi-function machines, which provide printing as well as other functions, such as coping and faxing.

"Print media" can be any physical object suited for printing, such as a sheet of paper, plastic, fabric, or other suitable physical print media substrate for rendering a document.

"Colored print media" refers to non-white print media, which is colored or clear and is generally less reflective than the "white" print media commonly available for printing. In the case of colored print media, a set of standard colors of print media may be considered, such as at least two or at least three of red (dark/pink), orange, yellow, green (dark/light), blue (dark/light), purple, black, brown and grey print media. In particular, in the CIELab color space, colored print media may meet at least one of: (1) an L* of less than 95, on a scale of 0-100, (2) an a* of greater than ±10 on a scale of −127 to +127, i.e., outside the range of −10 to +10, and (3) a b* of greater than ±10 on a scale of −127 to +127, i.e., outside the range of −10 to +10.

"White print media" generally refers to print media which is close to (100, 0, 0) in the CIELab color space, in particular, L* is at least 95, a* is in the range of 0±10, and b* is in the range of 0±10.

A "document" is normally a set of related sheets or electronic document pages, from a particular user, or otherwise related, although in some instances, a document may comprise a single sheet or image. Documents to be rendered on the print media by the printer may include digital information comprising images, graphics and/or text.

A "print job" includes one or more documents in a format suitable for processing by a printer and may include one or more page images which define the colors to be printed, e.g., in a device-independent color space, such as RGB or CMYK color separation values. A print job further includes printing instructions, e.g., in a job header, in particular, the type of print media to be used in rendering each page image.

As used herein, a "pixel" refers to the smallest segment into which an image can be divided. Received pixels of an input image are associated with a color value defined in terms of a color space, such as color, intensity, lightness, brightness, or some mathematical transformation thereof. Pixel color separation values may be converted to a chrominance-luminance space using, for instance, an RGB-to-YCbCr converter to obtain luminance (Y) and chrominance (Cb,Cr) values. It should be appreciated that pixels may be represented by values other than RGB or YCbCr.

A "user" can be any person interacting with a print driver via a user interface.

A "multidimensional look-up table" can be any data structure or transformation for converting input colors in a device-independent color space to output color values (i.e., expressed in a device-dependent color space), which determine the level of colorants to be applied for each pixel.

With reference to FIG. 1, a functional block diagram of an image processing system 10 is shown. The system 10 is configured to print digital documents 12. The illustrated system 10 includes one or more one or more printers 14 which are communicatively connected with one or more computing devices 16, e.g., by a common network 18, such as a wired or wireless local area network (LAN) or wide area network (WAN), such as the Internet. The computing devices 16 (only one of which is illustrated) may be directly connected with the printer(s) 14 or may communicate with the printer via an intermediate network server (not shown).

The computing device 16 generates a processed document 20 from the digital document 12 and incorporates the processed document 20 in a print job 22, together with a print job header 24, which provides instructions to the printer 14 for rendering the processed document on a selected print media type. The processed document may be defined in terms of an input color (e.g., a set of color separation values) for each pixel of each page image of the document.

The illustrated printer 14 includes a printer controller 28, a print media supply 30, one or more marking devices 32, and an output device 34, which are connected by a sheet transport path 36. Print media sheets 38 are delivered from the print media supply 30 onto the transport path 36 by a sheet feeder 40. The sheets are conveyed in a downstream direction along the transport path 36 to the one or more marking devices 32, and ultimately to the output device 34, by a sheet conveyor system 42, composed of rollers, conveyor belts, airjets, combinations thereof, or the like. For duplex printing, the sheet transport path 36 may include a return path which returns sheets 38 that have been printed on a first side to the marking device for printing on the second side. Alternatively, a second marking device, downstream from the first, prints the second side.

The print media supply 30 may include a set of trays 50, 52, 54, etc. which each hold a respective stack 56, 58, 60 of sheets 38. In the illustrated embodiment, one or more of the stacks may consist of non-white sheets 38, such as the blue, orange, and green sheets illustrated.

The marking device(s) 32 apply images 62 to print media, using one or more colorants, such as inks or toners, supplied from respective colorant sources 64, 66, 68, 70, 72. In the illustrated embodiment, one of the toners is white (W), while others may be the three primary colorants, cyan (Y), magenta (M), and yellow (Y), and optionally one or more other colorants, denoted X, such as black (K), a custom colorant, and/or a clear coat. However, different combinations of colorants may be employed. In one embodiment, the marking device 32 includes at least three colorant sources or at least four colorant sources. In one embodiment, the colorants are laid down on the print media in layers, with the first colorant applied first, before the second colorant is applied, and so forth.

In one embodiment, the marking device 32 is an inkjet marking device, which applies the colorants, in the form of liquid inks, to the print media 38 as small droplets, which are ejected from a set of inkjet heads. The liquid inks may be water-based inks, which are dried (fixed) to the sheet with heat by a dryer downstream of the inkjet heads. Alternatively, or additionally, the inks may include a radiation curable material, which is cured (fixed) with radiation, such as UV, by a UV curing station, downstream of the inkjet heads.

In another embodiment, the marking device 32 is an electrophotographic (laser) marking device, which applies colorants in the form of different toners to the print media 38 using a photoreceptor, which may be in the form of a belt or drum. The toners may be in the form of particles, which are fixed to the sheet with heat and/or pressure, e.g., by a dryer downstream of the photoreceptor.

In another embodiment, the marking device 32 is an offset marking device, which applies colorants, e.g., in the form of colored toners or inks, to a transfer member which transfers image to the print media.

Other types of marking device, and/or a combination of types of marking device, are also contemplated.

A sensor device 74, such as a spectrophotometer, e.g., a full width array scanner, may be positioned to sample the printed sheet, i.e., to capture an output color (e.g., a set of color separation values) from each of a set of spaced locations in the printed image 62. The output color separation values may be acquired in a suitable sensor color space. In one embodiment, the sensor device 74 may acquire a digital colored image 76. In some embodiments, the sensor device samples colors of a printed test pattern. This scanner may be an inline or an offline scanner. In one embodiment, an inline scanner 74 is positioned adjacent the paper path, downstream of the marking device 32 and upstream of the output tray 34.

The output device 34 of the printer may include one or more trays, positioned downstream of the marking device(s) 32 and sensor device 74. The trays collect the output printed pages, e.g., as a stack of printed pages. As will be appreciated, the printer 14 may include additional components, such as one or more of a stacker, stapler, bookbinder, user interface, controller, and the like.

Figure 2:
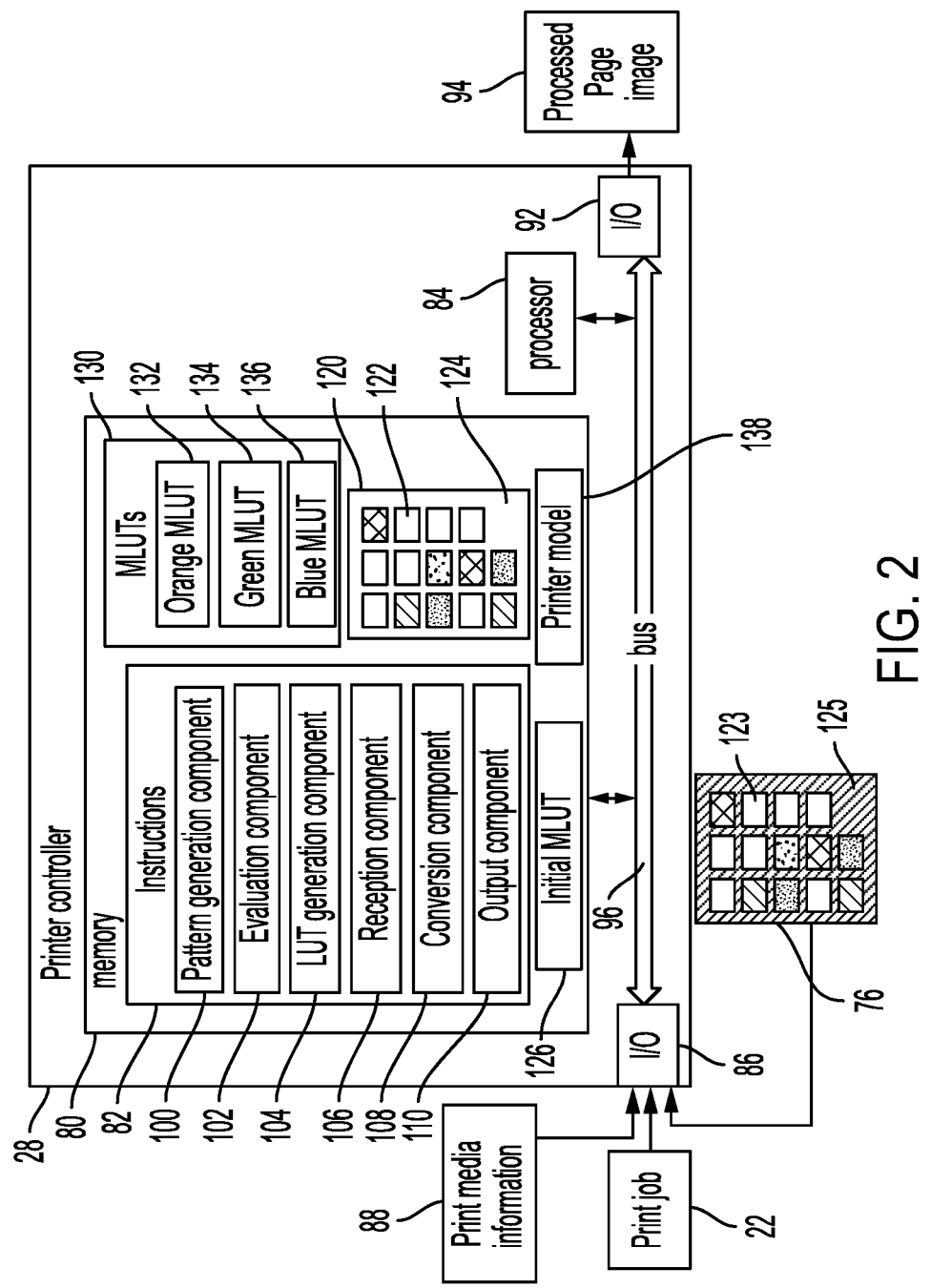
FIG. 2 is a functional block diagram of exemplary components of the system of FIG. 1.

With reference also to FIG. 2, the printer controller 28 includes memory 80, which stores instructions 82 for processing the incoming print job 22, in accordance with the job header 24. A processor 84, in communication with the memory, executes the instructions. An input device 86 receives the print job 22, which may be stored in local memory 80 during processing. The input device 86, or a separate input device, receives inputs from various components of the printer which are used to process the print job. For example, information 88 regarding the print media, such as a barcode, or other identifier, is acquired from a bar code reader 90. The bar code which scans a barcode, on the print media packaging which identifies the type of print media 56 being placed in an open tray 50. The barcode may be used to identify information about the print media, including its color, e.g., a name of the print media color, or a set of color separation values, or other identifier. An input/output device 92 sends each processed page image 94 of the print job to the marking engine 32 for printing. Hardware components 80, 84, 86, 92 of the controller 28 communicate via a data/control bus 96.

The illustrated software instructions include a pattern generation component 100, an evaluation component 102, an LUT generation component 104, a reception component 106, a conversion component 108, and an output component 110.

Briefly, the pattern generation component 100 has access to a digital test pattern 120, which may be stored in memory 80, or remotely. The test pattern 120 includes a set of colored patches 122 of different colors, intended to be printed with different combinations of the colorants to cover the gamut of the printer (or at least those regions of the gamut in which the colored print media are expected to be located). There may be at least 50 or at least 100 of the patches, such as up to 500 patches of different colors in the test pattern 120. Each colored patch is associated with an input color (e.g., a set of color separation values, expressed in a device-independent color space). The pattern generation component 100 sends instructions to the marking device 32 for rendering the digital test pattern 120 on a selected print medium. The instructions may include output color values for rending the patches. These output color values may be determined through accessing an initial multi-dimensional look-up table 126, which may have been generated for use with white print media. The initial MLUT converts input colors in the test pattern to output color values.

The locations of the printed patches on the printed sheet(s) of the print medium are known, so that their measured output colors (color separation values measured by the sensor 74) can be associated, in memory, with the respective input color of the corresponding digital color patch. In the illustrated embodiment, the patches 122 are equally spaced. A region 124 of the test pattern 120 is left blank, and is left unprinted by the marking engine, i.e., the print media provides a background region in the printed test pattern 62.

The test pattern 120 is sent to the marking device 32 for printing and instructions are sent to the sheet feeder 40 for supplying each of the available colored media to the marking device. For example, the test pattern 120 is rendered on each of the example blue, orange, and green print media and a respective test set of sampled output colors is acquired by the scanner 74 for each of the three different print media. For example, the output colors may be acquired as test pattern patches 123 in a test image 76 corresponding to the colored patches 122, and a background region 125, corresponding to the blank region 124.

The evaluation component 102 acquires the scanned images 76 (sampled output colors) of the printed test pattern from the scanner 74 and stores them to memory 82.

For each print media color, the sampled colors of the test pattern patches 123 in the test image 76 (or otherwise sampled output colors) are compared to the sampled output color of the background region 125, by the evaluation component 102, to identify a closest match. The corresponding input color of this patch is then considered as the color of the print media.

The LUT generation component 102 generates a set 130 of multidimensional look up tables (MLUTs) 132, 134, 136, one MLUT for each of the print media colors. Each MLUT is configured for converting input color separation values, specified in a print job 22, to output color values, for each of the colorants currently used in the printer. In each MLUT, input color values corresponding to the measured values of the blank region 124 in the test image 76 are converted to "no colorant" output color values. Thus, for example, if the blank region 124 of the test image 76 acquired when the test pattern is printed on orange paper 58 has input color values of (0, 35, 85, 0) in CMYK color space, the "orange" LUT 132 converts these values to output color values of (0, 0, 0, 0) for the four standard colorants (W,C,M,Y) used in the marking device. It is assumed that no MLUT is employed for any custom color (X), if used. One method for generating the MLUTs is described below.

There may be at least one, or at least two, or at least three MLUTs 132, 134, 136, etc., such as up to 20. A respective MLUT may be generated for each of a standard set of print media colors. Thus, for eleven standard print media colors (gray, black, white, yellow, green, pink, red, orange, purple, brown, and cyan), eleven MLUTs may be generated and stored in memory for use in subsequent print jobs.

In one embodiment, the controller, e.g., the LUT generation component 102 may send the input color separation values identified for the print media to the computing device 16 used for generating the print job 22. The computing device 16 may store the color separation values for each of the colors of print media in a background look-up table (BLUT) 140. For example, the BLUT may store the color separation values of (0, 35, 85, 0) in CMYK or CMYW color space for the orange print media. A print driver 142 of the computing device 16 may access the BLUT to determine the color separation values when a user of the computing device specifies one of the print media colors by name or by default. The print driver 142 may then insert the print media's color separation values for pixels of the processed document 22 in regions where the document 12 does not specify any color.

As will be appreciated, once the MLUTs have been generated, the pattern generation component 100, evaluation component 102, and LUT generation component 104 are no longer required and a printer without such components may be shipped to a customer.

The reception component 104 receives a print job 22 into memory 80.

The conversion component 106 converts each page image of the print job 22 into output color values for each pixel using the MLUT for the print media specified in the print job, to generate a processed page image 94. Thus, for example, if the job header specifies green print media, the conversion component accesses the green MLUT 132 to identify the standard white, cyan, magenta, and yellow output color values for each pixel. When the print job specifies color separation values which correspond to the print media color identified by the scanner, the MLUT converts the input color separation values to "no colorant" output color values (0,0,0,0) for each of the standard colorants. As a result, corresponding pixels of the image 62 are left blank, and the print media 38 serves as the colorant.

The underlying color transformation is designed in such a way so that as color mix approaches the media color no colorant is deposited on the media thereby creating a no colorant spot.

For colors that are close to that of the print media, e.g., colors that are close to orange, in the case of orange print media, these may be formed by applying colorants as small dots over the print medium, such that the region appears to the human eye to be a single uniform color.

The blank region of the image 62 is optionally covered with a clear coat, where the marking device is configured to apply a clear colorant X. Thus, the MLUT 132 may output (0,0,0,0,100) in the five-colorant example of FIG. 1, where colorant source 72 contains clear toner. Optionally, the blank region may be printed with a pattern, such as a watermark. These options may be separately specified in the print job header.

In one embodiment, when none of the set of MLUTs corresponds to the user-selected print media color, an MLUT for the closest available color, or gray, may be selected.

The output component 108 outputs the processed page image 94 specifying output color values to the marking device.

As will be appreciated, some of the operations described herein as being performed by the printer controller 28 may be performed elsewhere in the system 10, such as by the print driver 142 or by an intermediate print server, to achieve the same result.

The print driver 142 may be configured to supply information used herein, such as that the user-selected print media color should be employed as a background color, or may be a conventional print driver. As with a conventional print driver, the illustrated print driver receives an input document 12 and user selections, converts the document to a printer-ready format, e.g., in a page description language, such as the PostScript® language, and outputs the processed document 20 to a selected printer 16 as a print job 22. A conventional print driver may interpret the blank areas of each document page as "white" and send a white value (e.g., (0,0,0) in RGB device-independent color space) to the printer 16. As a result, the printer may use a large amount of toner and not achieve the user's intended result. By assigning the color separation values of the print media to the blank regions in the print driver, the printer can convert these color separation values to zero colorant automatically.

In another embodiment, the user may generate the document 12 with output color values corresponding to the selected print media.

The I/O interface devices 86, 92 serve to couple the printer controller 28 to other devices, such as the computing device, marking device, and other components of the printer, and can each be a modulator/demodulator (MODEM). Additional I/O devices (not shown) may couple the printer controller 28 to an associated user interface device, such as a color screen and/or audio device, and a keyboard, keypad, cursor control device, touch screen, combination thereof, or the like for inputting instructions and for communicating user input information and command selections to the processor 84.

The memory 80 of the printer controller 28 may represent any type of computer readable medium such as random access memory (RAM), read only memory (ROM), magnetic disk or tape, optical disk, flash memory, or holographic memory. In one embodiment, the memory 80 comprises a combination of random access memory and read only memory. In some embodiments, the processor 84 and memory 80 may be combined in a single chip.

The digital processor device 84 can be variously embodied, such as by a single-core processor, a dual-core processor (or more generally by a multiple-core processor), a digital processor and cooperating math coprocessor, a digital controller, or the like. The digital processor 84, in addition to executing the software instructions 82 for performing the method described below may also control the operation of components of the printer 14, such as the feeder, marking engine, and scanner.

The term "software," or "instructions," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The client computing device 16 may be in the form of a conventional general purpose personal computer, such as a desktop, a laptop, palmtop computer, portable digital assistant (PDA), cellular telephone, pager, or other digital device with capability for processing input documents 12 and outputting processed documents 20 to the printer 14 in the form of a print job 22. The computing device 16 may include memory, which stores the print driver 142 and BLUT 140, and a hardware processor, in communication with the memory, for implementing the print driver and other software components stored on the computer.

Figure 3:
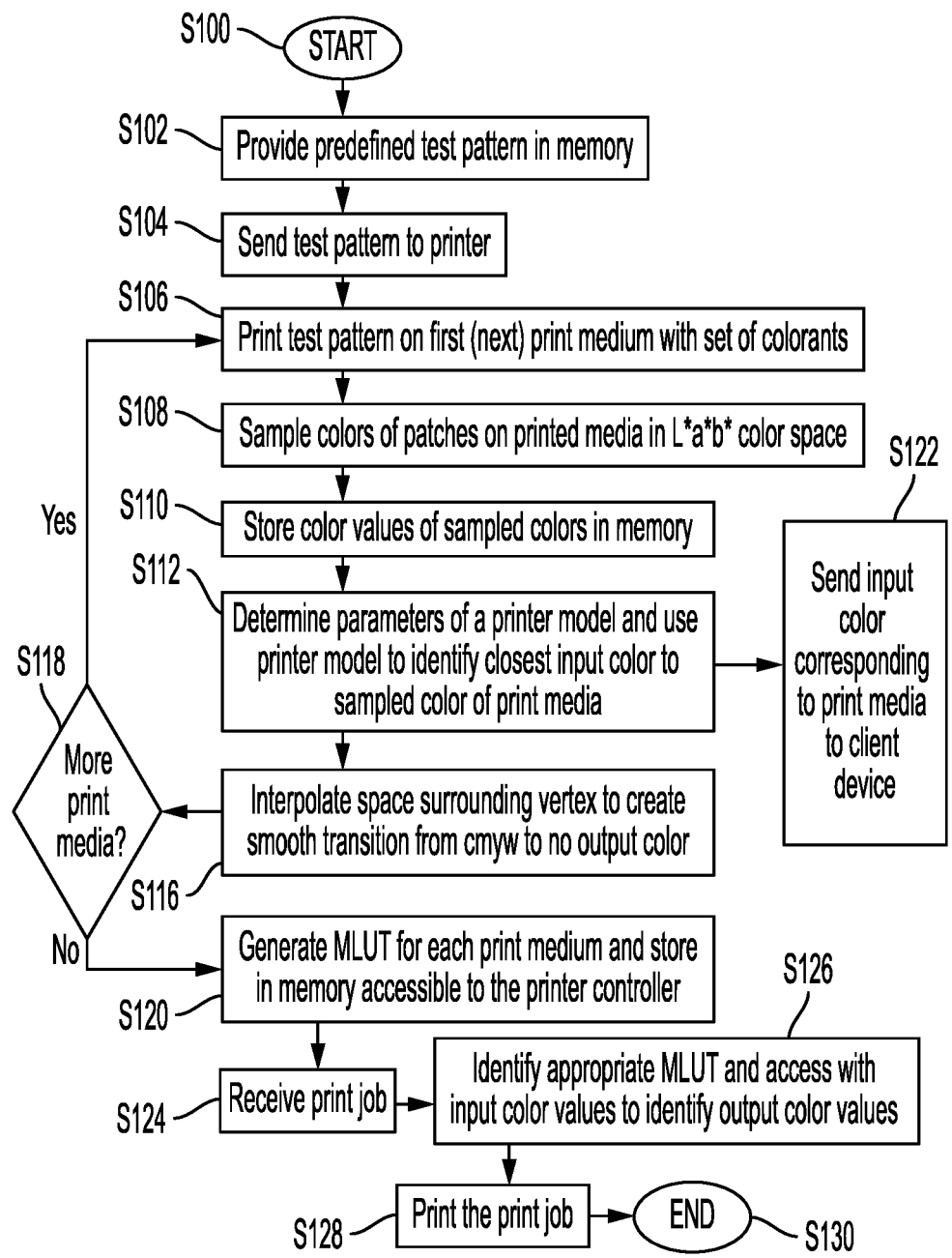
FIG. 3 is a flow chart illustrating an image processing method in accordance with another aspect of the exemplary embodiment.

With reference to FIG. 3, a method for generating a look-up table specific to a colored print medium, and use of such in a printer is illustrated. The method may be performed in the system of FIGS. 1 and 2. The method begins at S100.

At S102, a predefined test pattern 120 is provided and may be stored in memory 80 of a computing device, such as memory of the printer controller 28.

At S104, for each print medium to be used in the printer, a test pattern 120 is sent to the marking device 32, by the pattern component 100, for rendering on a first print medium. This step may be performed in the factory, prior to shipping the printer to a customer, and/or at a later stage, e.g., when a user places a new color of print media in one of the print media trays 50, 52, 54.

At S106, the test pattern 120 is printed on the print media to generate a printed image 62.

At S108, colors of the printed media are sampled. For example, the printed image 62 is scanned, by the sensor component 74, to generate a scanned image 76 or a set of sampled color separation values for each of the test patches. The sampled color separation values also include color separation values for the background region 125.

At S110, the color separation values recorded for each of the test patches and the background region 125 are stored in memory. In one embodiment, the color separation values of the printed patches are measured by the sensor 74 in a three-dimensional lightness-chromaticity color space, such as the CIE L*a*b* space, hsv space, or luv space. In the following, the L*a*b* space is referenced as an example.

Figure 4:
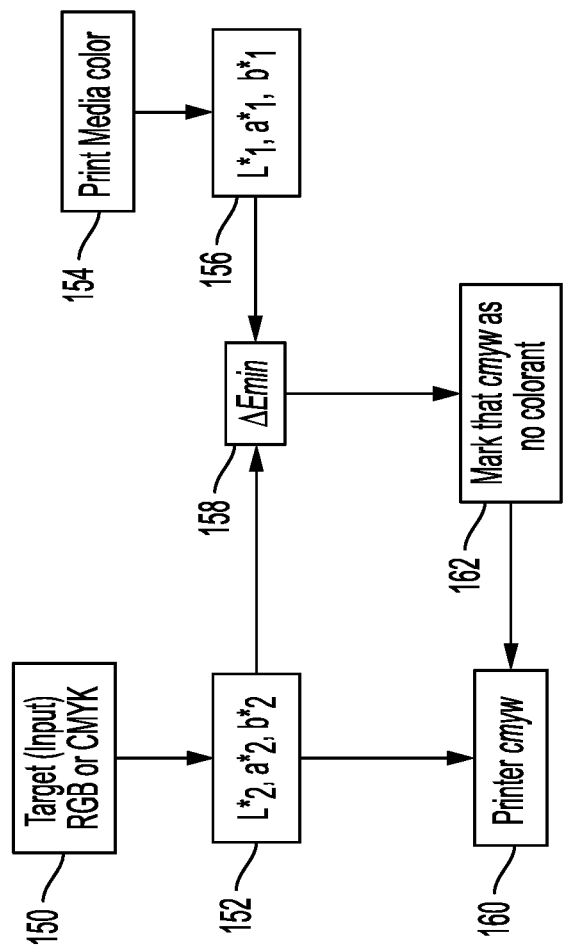
FIG. 4, illustrates generation of a multidimensional look-up table.

At S112, color separation values for the selected print media 38, corresponding to the sampled color of the print media, are determined in an input (device-independent) color space, such as CMYK or RGB. In one embodiment, this includes determining the parameters for a suitable printer model 138. The printer model is used to calculate a transformation from input RGB, CMYK or CMYW color separation values (e.g., of the patches 122) to the L*a*b* color space (as output by the sensor). FIG. 4 graphically illustrates these steps. An input patch color 150 corresponds to a sensed color 152 when printed on the selected print media. The print media color 154 corresponds to a sensed color 156.

The L*, a*, b* value 152 in the printer model 138 that is the closest match to the print media's sensed L*, a*, b* 156 is identified. This can be the L*, a*, b* value with minimum $\Delta E$, $\Delta E_{min}$ 158, where $\Delta E$ may be determined according to Eqn. (1):

$$\Delta E = \sqrt{(L^*_1 - L^*_2)^2 + (a^*_1 - a^*_2)^2 + (b^*_1 - b^*_2)^2} \quad (1)$$

where $L^*_1$, $a^*_1$, and $b^*_1$ are the color separation values 156 of the print media 38 (output by the sensor 74); and $L^*_2$, $a^*_2$, and $b^*_2$ are the color separation values 152 of one of the colors in the printer model 138.

The CMYW vector 160 corresponding to $L^*_2$, $a^*_2$, $b^*_2$ 152 for the minimum $\Delta E$ 158 is stored as the print media color and is equated to no colorant 162 in the respective MLUT 132, 134, or 136.

At S114, once the "no colorant" output color vertex (input 150=CMYW 160) is established, the multi-dimensional space around this vertex may be interpolated, e.g., with tessellated tetrahedral interpolation, to calculate the CMY values around it to result in a smooth transition from a mix of CMYW to no colorant. See, for example, U.S. Pub. No. 20110286015 A1, published Nov. 24, 2011, by Maltz, et al., which describes one method of performing tetrahedral interpolation which can be employed herein, the disclosure of which is incorporated herein by reference. Each MLUT 132, 134, 136 may be generated by adapting the initial multi-dimensional look-up table 126.

At S118, if there are more print media colors, the method returns to S104 or S106, where the next print media is considered, otherwise to S120.

At S120, an MLUT 132, 134, 136 is generated for each print media color, by the LUT generation component 104. In each MLUT, the set of CMYW color separation values 160 output by the printer model corresponding to the print media color 154 are converted to "no colorant" output color values. In each MLUT, at least a set of the input colors close to the paper color are converted to output color values that take into account the influence of the paper color on the printed media. The MLUTs are stored in printer memory 80 or otherwise made accessible to the printer controller.

Steps S104-S120 may be repeated one or more times to ensure that each MLUT is optimized for the respective print media.

At S122, the color separation values determined for the print media color at S112 may be sent to, or otherwise made accessible to, the computing device(s) 16, by the output component 110. As will be appreciated, once the MLUTs 132, 134, 136, etc. have been generated, they may be provided to a printer controller of a similarly-configured printer, for use in that printer.

At this stage, if the generation of the MLUTs is performed by the manufacturer, the printer and MLUTs may be shipped to a customer.

At S124, a print job 22 incorporating a document 12 to be printed is received, e.g., from a client computing device 16. The print job may have been generated using the set of input color values 150 previously identified for the selected print medium.

At S126, for each page image, the appropriate MLUT 130, 132 or 134 corresponding to the selected print media color is identified by the conversion component 108. The identified MLUT is accessed with the input color separation values for each pixel to identify corresponding output color values. Each output color value corresponds to a respective one of the set of colorants, available for printing. As a result, those areas of each page image that are the same color as the selected print media color are converted to output color values that result in no colorant being applied by the standard colorant sources 64, 66, 68, 70.

At S128, each processed page image is sent to the marking device 32, by the output component 110, for printing. Each page image (that is not blank) is then rendered by the marking device using one or more of the respective colorants, using the color of the print media to provide at least a part of the color of the printed image 62.

The method ends at S130.

The method illustrated in FIG. 3 may be implemented in a computer program product or products that may be executed on a computing device, such as the printer controller. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the printer 14 (for example, an internal hard drive of RAM), or may be separate (for example, an external hard drive operatively connected with the printer controller 28), or may be separate and accessed via a digital data network such as a local area network (LAN) or the Internet (for example, as a redundant array of inexpensive or independent disks (RAID) or other network server storage that is indirectly accessed by the printer controller 28, via a digital network 18).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIG. 3, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for adapting a printer to use a color of a print medium in printing, comprising:
with a set of colorants, printing a set of color patches on a first print medium having a first color, each of the printed color patches being generated based on a respective input color;
measuring an output color of each of the printed color patches and a color of an unprinted region of the first print medium;
identifying a measured output color of one of the printed color patches that is closest to the measured color of the unprinted region, the identifying comprising computing a difference, in a common color space, between the output color of each printed color patch and the measured color of the unprinted region and identifying the printed color patch with the lowest distance;
generating a first multidimensional look-up table in which the input color of the printed color patch having the measured output color that is closest to the color of the unprinted region is set to be printed without the colorants.

2. The method of claim 1, wherein the common color space is a L*a*b*color space.

3. The method of claim 1, further comprising outputting the input color of the printed color patch having the measured output color that is closest to the measured color of the unprinted region to a client device for generating a print job which specifies the first print medium.

4. The method of claim 1, further comprising receiving a print job for printing on the first print medium and accessing the first multidimensional look-up table to identify output color values for printing the print job on the first print medium.

5. The method of claim 4, further comprising printing the print job on the first print medium.

6. The method of claim 1, wherein the printing of the set of color patches on the first print medium comprises providing a test pattern in memory and sending the test pattern to a printer which prints the test pattern using a set of colorants to form the printed color patches.

7. The method of claim 1, wherein the first multidimensional look-up table is configured for outputting a set of output color values for an input color expressed in device-independent color space.

8. The method of claim 1, wherein the set of colorants comprises a plurality of toners or inks of different colors.

9. The method of claim 1, wherein the set of colorants comprises a white colorant and a plurality of colorants other than white.

10. A computer program product comprising a non-transitory recording medium storing instructions, which when executed on a computer, causes the computer to perform the method of claim 1.

11. A system for generating multidimensional look-up tables comprising:
a pattern generation component which sends a test pattern comprising a set of color patches to an associated marking device for rendering with a set of colorants on a first colored print medium, the first colored print medium having a first non-white color, to generate a set of printed color patches on the first colored print medium;
an evaluation component which receives a measured output color of each of the printed color patches and a measured non-white color of an unprinted region of the first print medium, the evaluation component identifying a measured output color of one of the printed color patches that is closest to the non-white color of the unprinted region;
a look-up table generation component which generates a first multidimensional look-up table in which the input color of the printed color patch having the measured output color that is closest to the non-white color of the unprinted region is set to be printed without the colorants; and
a processor which implements the components.

12. The system of claim 11, wherein the identifying a measured output color of one of the printed color patches that is closest to the measured color of the unprinted region comprises computing a difference, in a common color space, between the output color of each printed color patch and the measured color of the unprinted region and identifying the printed color patch with the lowest distance.

13. The system of claim 11, further comprising a conversion component which accesses the first multidimensional look-up table to convert input colors of a print job to output color values for rendering the print job on the first print medium.

14. The system of claim 11, wherein the system generates a respective multidimensional look-up table for each of a set of print media of different colors.

15. The system of claim 11, further comprising the marking engine.

16. A method for adapting a printer to use a color of a print medium in printing, comprising:
for a first print medium having a first color:
with a set of colorants, printing a set of color patches on the first print medium, each of the printed color patches being generated based on a respective input color;
measuring an output color of each of the printed color patches and a color of an unprinted region of the first print medium;
identifying a measured output color of one of the printed color patches that is closest to the measured color of the unprinted region;
generating a first multidimensional look-up table in which the input color of the printed color patch having the measured output color that is closest to the color of the unprinted region is set to be printed without the colorants;
for at least a second print medium having a second color:
printing of a set of color patches on the second print medium, each of the printed color patches being generated based on a respective input color;
measuring an output color of each of the printed color patches and a color of an unprinted region of the second print medium;
identifying a measured output color of one of the printed color patches that is closest to the measured color of the unprinted region; and
generating a second multidimensional look-up table in which the input color of the printed color patch having the measured output color that is closest to the measured color of the unprinted region is set to be printed without the colorants.

17. The method of claim 16, wherein the generating of the second multidimensional look-up table further comprises interpolating a multi-dimensional space around an input color of the printed color patch having the measured output color that is closest to the color of the unprinted region to provide a transition from a mix of colorants to no colorant.

18. A printing system comprising:
memory which stores a set of multidimensional look-up tables, comprising:
a first multidimensional look-up table which has been generated by printing a test pattern on a first print medium having a first color and identifying a measured color of a printed patch that is closest to a measured color of the first print medium, in the first multidimensional look-up table, the input color of the printed color patch having the measured color that is closest to the measured color of an unprinted region of the first print medium being set to be printed without the colorants; and
a second multidimensional look-up table which has been generated by printing the test pattern on a second print medium having a second color, different from the first color, and identifying a measured color of a printed patch that is closest to a measured color of the second print medium, in the second multidimensional look-up table, the input color of the printed color patch having the measured color that is closest to the measured color of an unprinted region of the second print medium being set to be printed without the colorants; and
a conversion component which, for an input print job specifying a color of print media, identifies one of the multidimensional look-up tables based on the specified color and accesses the one of the multidimensional look-up tables to identify output color values for printing the input print job; and
a processor which implements the conversion component.

19. The system of claim 18, further comprising a marking engine which prints the print job based on the identified output color values.

20. The system of claim 19, wherein the marking engine includes a plurality of colorants including a white colorant and a plurality of colorants other than white.

* * * * *